US008659601B1

(12) United States Patent
Mahan et al.

(10) Patent No.: US 8,659,601 B1
(45) Date of Patent: Feb. 25, 2014

(54) PROGRAM SEQUENCER FOR GENERATING INDETERMINANT LENGTH SHADER PROGRAMS FOR A GRAPHICS PROCESSOR

(75) Inventors: Justin Michael Mahan, Fremont, CA (US); Edward A. Hutchins, Mountain View, CA (US); Ewa M. Kubalska, Los Gatos, CA (US); James T. Battle, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 797 days.

(21) Appl. No.: 11/893,404

(22) Filed: Aug. 15, 2007

(51) Int. Cl.
*G06T 15/00* (2011.01)
*G06T 15/50* (2011.01)
*G06T 1/00* (2006.01)
*G06T 1/60* (2006.01)

(52) U.S. Cl.
USPC ............ 345/426; 345/419; 345/522; 345/530

(58) Field of Classification Search
USPC .................................. 345/419, 426, 522, 530
See application file for complete search history.

(56) References Cited

U.S. PATENT DOCUMENTS

| | | |
|---|---|---|
| 3,091,657 A | 5/1963 | Stuessel |
| 3,614,740 A | 10/1971 | Delagi et al. |
| 3,987,291 A | 10/1976 | Gooding et al. |
| 4,101,960 A | 7/1978 | Stokes et al. |
| 4,541,046 A | 9/1985 | Nagashima et al. |
| 4,566,005 A | 1/1986 | Apperley et al. |
| 4,748,585 A | 5/1988 | Chiarulli et al. |
| 4,897,717 A | 1/1990 | Hamilton et al. |
| 4,958,303 A | 9/1990 | Assarpour et al. |
| 4,965,716 A | 10/1990 | Sweeney |
| 4,965,751 A | 10/1990 | Thayer et al. |
| 4,985,848 A | 1/1991 | Pfeiffer et al. |
| 5,040,109 A | 8/1991 | Bowhill et al. |
| 5,047,975 A | 9/1991 | Patti et al. |
| 5,175,828 A | 12/1992 | Hall et al. |
| 5,179,530 A | 1/1993 | Genusov et al. |
| 5,197,130 A | 3/1993 | Chen et al. |
| 5,210,834 A | 5/1993 | Zurawski et al. |
| 5,263,136 A | 11/1993 | DeAguiar et al. |

(Continued)

FOREIGN PATENT DOCUMENTS

| | | |
|---|---|---|
| DE | 29606102 | 6/1996 |
| JP | 07-101885 | 4/1995 |

(Continued)

OTHER PUBLICATIONS gDEBugger, graphicREMEDY, http://www.gremedy.com, Aug. 8, 2006.

(Continued)

*Primary Examiner* — Hau Nguyen (57) ABSTRACT

A method for loading and executing an indeterminate length shader program. The method includes accessing a first portion of a shader program in graphics memory of a GPU and loading instructions from the first portion into a plurality of stages of the GPU to configure the GPU for program execution. A group of pixels is then processed in accordance with the instructions from the first portion. A second portion of the shader program is accessed in graphics memory of the GPU and instructions from the second portion are loaded into the plurality of stages of the GPU to configure the GPU for program execution. The group of pixels are then processed in accordance with the instructions from the second portion.

20 Claims, 6 Drawing Sheets

(56) References Cited

U.S. PATENT DOCUMENTS

| | | |
|---|---|---|
| 5,327,369 A | 7/1994 | Ashkenazi |
| 5,357,623 A | 10/1994 | Megory-Cohen |
| 5,375,223 A | 12/1994 | Meyers et al. |
| 5,388,206 A | 2/1995 | Poulton et al. |
| 5,388,245 A | 2/1995 | Wong |
| 5,418,973 A | 5/1995 | Ellis et al. |
| 5,430,841 A | 7/1995 | Tannenbaum et al. |
| 5,430,884 A | 7/1995 | Beard et al. |
| 5,432,905 A | 7/1995 | Hsieh et al. |
| 5,517,666 A | 5/1996 | Ohtani et al. |
| 5,522,080 A | 5/1996 | Harney |
| 5,560,030 A | 9/1996 | Guttag et al. |
| 5,561,808 A | 10/1996 | Kuma et al. |
| 5,574,944 A | 11/1996 | Stager |
| 5,627,988 A | 5/1997 | Oldfield |
| 5,644,753 A | 7/1997 | Ebrahim et al. |
| 5,649,173 A | 7/1997 | Lentz |
| 5,666,169 A | 9/1997 | Ohki et al. |
| 5,682,552 A | 10/1997 | Kuboki et al. |
| 5,682,554 A | 10/1997 | Harrell |
| 5,706,478 A | 1/1998 | Dye |
| 5,754,191 A | 5/1998 | Mills et al. |
| 5,761,476 A | 6/1998 | Martell |
| 5,764,243 A | 6/1998 | Baldwin |
| 5,784,590 A | 7/1998 | Cohen et al. |
| 5,784,640 A | 7/1998 | Asghar et al. |
| 5,796,974 A | 8/1998 | Goddard et al. |
| 5,802,574 A | 9/1998 | Atallah et al. |
| 5,809,524 A | 9/1998 | Singh et al. |
| 5,812,147 A | 9/1998 | Van Hook et al. |
| 5,835,788 A | 11/1998 | Blumer et al. |
| 5,848,254 A | 12/1998 | Hagersten |
| 5,920,352 A | 7/1999 | Inoue |
| 5,925,124 A | 7/1999 | Hilgendorf et al. |
| 5,940,090 A | 8/1999 | Wilde |
| 5,940,858 A | 8/1999 | Green |
| 5,949,410 A | 9/1999 | Fung |
| 5,950,012 A | 9/1999 | Shiell et al. |
| 5,978,838 A | 11/1999 | Mohamed et al. |
| 5,999,199 A | 12/1999 | Larson |
| 6,009,454 A | 12/1999 | Dummermuth |
| 6,016,474 A | 1/2000 | Kim et al. |
| 6,041,399 A | 3/2000 | Terada et al. |
| 6,049,672 A | 4/2000 | Shiell et al. |
| 6,073,158 A | 6/2000 | Nally et al. |
| 6,092,094 A | 7/2000 | Ireton |
| 6,108,766 A | 8/2000 | Hahn et al. |
| 6,112,019 A | 8/2000 | Chamdani et al. |
| 6,131,152 A | 10/2000 | Ang et al. |
| 6,141,740 A | 10/2000 | Mahalingaiah et al. |
| 6,144,392 A | 11/2000 | Rogers |
| 6,150,610 A | 11/2000 | Sutton |
| 6,189,068 B1 | 2/2001 | Witt et al. |
| 6,192,073 B1 | 2/2001 | Reader et al. |
| 6,192,458 B1 | 2/2001 | Arimilli et al. |
| 6,208,361 B1 | 3/2001 | Gossett |
| 6,209,078 B1 | 3/2001 | Chiang et al. |
| 6,222,552 B1 | 4/2001 | Haas et al. |
| 6,230,254 B1 | 5/2001 | Senter et al. |
| 6,239,810 B1 | 5/2001 | Van Hook et al. |
| 6,247,094 B1 | 6/2001 | Kumar et al. |
| 6,252,610 B1 | 6/2001 | Hussain |
| 6,292,886 B1 | 9/2001 | Makineni et al. |
| 6,301,600 B1 | 10/2001 | Petro et al. |
| 6,314,493 B1 | 11/2001 | Luick |
| 6,317,819 B1 | 11/2001 | Morton |
| 6,351,808 B1 | 2/2002 | Joy et al. |
| 6,370,617 B1 | 4/2002 | Lu et al. |
| 6,437,789 B1 | 8/2002 | Tidwell et al. |
| 6,438,664 B1 | 8/2002 | McGrath et al. |
| 6,480,927 B1 | 11/2002 | Bauman |
| 6,490,654 B2 | 12/2002 | Wickeraad et al. |
| 6,496,902 B1 | 12/2002 | Faanes et al. |
| 6,499,090 B1 | 12/2002 | Hill et al. |
| 6,525,737 B1 | 2/2003 | Duluk, Jr. et al. |
| 6,529,201 B1 | 3/2003 | Ault et al. |
| 6,597,357 B1 | 7/2003 | Thomas |
| 6,603,481 B1 | 8/2003 | Kawai et al. |
| 6,624,818 B1 | 9/2003 | Mantor et al. |
| 6,629,188 B1 | 9/2003 | Minkin et al. |
| 6,631,423 B1 | 10/2003 | Brown et al. |
| 6,631,463 B1 | 10/2003 | Floyd et al. |
| 6,657,635 B1 | 12/2003 | Hutchins et al. |
| 6,658,447 B2 | 12/2003 | Cota-Robles |
| 6,674,841 B1 | 1/2004 | Johns et al. |
| 6,700,588 B1 | 3/2004 | MacInnis et al. |
| 6,715,035 B1 | 3/2004 | Colglazier et al. |
| 6,732,242 B2 | 5/2004 | Hill et al. |
| 6,809,732 B2 | 10/2004 | Zatz et al. |
| 6,812,929 B2 | 11/2004 | Lavelle et al. |
| 6,825,843 B2 | 11/2004 | Allen et al. |
| 6,825,848 B1 | 11/2004 | Fu et al. |
| 6,839,062 B2 | 1/2005 | Aronson et al. |
| 6,862,027 B2 | 3/2005 | Andrews et al. |
| 6,891,543 B2 | 5/2005 | Wyatt |
| 6,915,385 B1 | 7/2005 | Leasure et al. |
| 6,944,744 B2 | 9/2005 | Ahmed et al. |
| 6,952,214 B2 | 10/2005 | Naegle et al. |
| 6,965,982 B2 | 11/2005 | Nemawarkar |
| 6,975,324 B1 | 12/2005 | Valmiki et al. |
| 6,976,126 B2 | 12/2005 | Clegg et al. |
| 6,978,149 B1 | 12/2005 | Morelli et al. |
| 6,978,457 B1 | 12/2005 | Johl et al. |
| 6,981,106 B1 | 12/2005 | Bauman et al. |
| 6,985,151 B1 * | 1/2006 | Bastos et al. ................... 345/519 |
| 7,015,909 B1 | 3/2006 | Morgan III et al. |
| 7,031,330 B1 | 4/2006 | Bianchini, Jr. |
| 7,032,097 B2 | 4/2006 | Alexander et al. |
| 7,035,979 B2 | 4/2006 | Azevedo et al. |
| 7,148,888 B2 | 12/2006 | Huang |
| 7,151,544 B2 | 12/2006 | Emberling |
| 7,154,500 B2 | 12/2006 | Heng et al. |
| 7,159,212 B2 | 1/2007 | Schenk et al. |
| 7,185,178 B1 | 2/2007 | Barreh et al. |
| 7,202,872 B2 | 4/2007 | Paltashev et al. |
| 7,260,677 B1 | 8/2007 | Vartti et al. |
| 7,305,540 B1 | 12/2007 | Trivedi et al. |
| 7,321,787 B2 | 1/2008 | Kim |
| 7,334,110 B1 | 2/2008 | Faanes et al. |
| 7,369,815 B2 | 5/2008 | Kang et al. |
| 7,373,478 B2 | 5/2008 | Yamazaki |
| 7,406,698 B2 | 7/2008 | Richardson |
| 7,412,570 B2 | 8/2008 | Moll et al. |
| 7,486,290 B1 | 2/2009 | Kilgariff et al. |
| 7,487,305 B2 | 2/2009 | Hill et al. |
| 7,493,452 B2 | 2/2009 | Eichenberger et al. |
| 7,545,381 B2 | 6/2009 | Huang et al. |
| 7,564,460 B2 * | 7/2009 | Boland et al. ................... 345/505 |
| 7,750,913 B1 | 7/2010 | Parenteau et al. |
| 7,777,748 B2 | 8/2010 | Bakalash et al. |
| 7,852,341 B1 | 12/2010 | Rouet et al. |
| 7,869,835 B1 | 1/2011 | Zu |
| 8,020,169 B2 | 9/2011 | Yamasaki |
| 2001/0026647 A1 | 10/2001 | Morita |
| 2002/0116595 A1 | 8/2002 | Morton |
| 2002/0130874 A1 | 9/2002 | Baldwin |
| 2002/0144061 A1 | 10/2002 | Faanes et al. |
| 2002/0194430 A1 | 12/2002 | Cho |
| 2003/0001847 A1 | 1/2003 | Doyle et al. |
| 2003/0003943 A1 | 1/2003 | Bajikar |
| 2003/0014457 A1 | 1/2003 | Desai et al. |
| 2003/0016217 A1 | 1/2003 | Vlachos et al. |
| 2003/0016844 A1 | 1/2003 | Numaoka |
| 2003/0031258 A1 | 2/2003 | Wang et al. |
| 2003/0067473 A1 | 4/2003 | Taylor et al. |
| 2003/0172326 A1 | 9/2003 | Coffin, III et al. |
| 2003/0188118 A1 | 10/2003 | Jackson |
| 2003/0204673 A1 | 10/2003 | Venkumahanti et al. |
| 2003/0204680 A1 | 10/2003 | Hardage, Jr. |
| 2003/0227461 A1 | 12/2003 | Hux et al. |
| 2004/0012597 A1 | 1/2004 | Zatz et al. |
| 2004/0073771 A1 | 4/2004 | Chen et al. |
| 2004/0073773 A1 | 4/2004 | Demjanenko |
| 2004/0103253 A1 | 5/2004 | Kamei et al. |

(56) References Cited

U.S. PATENT DOCUMENTS

| | | | |
|---|---|---|---|
| 2004/0193837 A1 | 9/2004 | Devaney et al. |
| 2004/0205326 A1 | 10/2004 | Sindagi et al. |
| 2004/0212730 A1 | 10/2004 | MacInnis et al. |
| 2004/0215887 A1 | 10/2004 | Starke |
| 2004/0221117 A1 | 11/2004 | Shelor |
| 2004/0263519 A1 | 12/2004 | Andrews et al. |
| 2005/0012759 A1 | 1/2005 | Valmiki et al. |
| 2005/0024369 A1 | 2/2005 | Xie |
| 2005/0071722 A1 | 3/2005 | Biles |
| 2005/0088448 A1 | 4/2005 | Hussain et al. |
| 2005/0239518 A1 | 10/2005 | D'Agostino et al. |
| 2005/0262332 A1 | 11/2005 | Rappoport et al. |
| 2005/0280652 A1 | 12/2005 | Hutchins et al. |
| 2006/0020843 A1 | 1/2006 | Frodsham et al. |
| 2006/0064517 A1 | 3/2006 | Oliver |
| 2006/0064547 A1 | 3/2006 | Kottapalli et al. |
| 2006/0103659 A1 | 5/2006 | Karandikar et al. |
| 2006/0152519 A1 | 7/2006 | Hutchins et al. |
| 2006/0152520 A1 | 7/2006 | Gadre et al. |
| 2006/0176308 A1 | 8/2006 | Karandikar et al. |
| 2006/0176309 A1 | 8/2006 | Gadre et al. |
| 2007/0076010 A1 | 4/2007 | Swamy et al. |
| 2007/0130444 A1 | 6/2007 | Mitu et al. |
| 2007/0285427 A1 | 12/2007 | Morein et al. |
| 2008/0016327 A1 | 1/2008 | Menon et al. |
| 2008/0278509 A1 | 11/2008 | Washizu et al. |
| 2009/0235051 A1 | 9/2009 | Codrescu et al. |
| 2012/0023149 A1 | 1/2012 | Kinsman et al. |

FOREIGN PATENT DOCUMENTS

| | | |
|---|---|---|
| JP | H08-077347 | 3/1996 |
| JP | H08-153032 | 6/1996 |
| JP | 08-297605 | 12/1996 |
| JP | 09-287217 | 11/1997 |
| JP | H09-325759 | 12/1997 |
| JP | 10-222476 | 8/1998 |
| JP | 11-190447 | 7/1999 |
| JP | 2000-148695 | 5/2000 |
| JP | 2001-022638 | 1/2001 |
| JP | 2003-178294 | 6/2003 |
| JP | 2004-252990 | 9/2004 |
| KR | 100262453 | 5/2000 |
| KR | 1998-018215 | 8/2000 |
| TW | 413766 | 12/2000 |
| TW | 436710 | 5/2001 |
| TW | 442734 | 6/2001 |

OTHER PUBLICATIONS

Duca et al., A Relational Debugging Engine for Graphics Pipeline, International Conference on Computer Graphics and Interactive Techniques, ACM SIGGRAPH 2005, pp. 453-463, ISSN:0730-0301.
Parhami, Behrooz, Computer Arithmetic: Algorithms and Hardware Designs, Oxford University Press 2000, pp. 413-418, ISBN:0-19-512583-5.
IBM TDB, Device Queue Management, vol. 31 Iss. 10, pp. 45-50, Mar. 1, 1989.
Hamacher, V. Carl et al., Computer Organization, Second Edition, McGraw Hill, 1984, pp. 1-9.
Graham, Susan L. et al., Getting Up to Speed: The future of Supercomputing, the National Academies Press, 2005, glossary.
Rosenberg, Jerry M., Dictionary of Computers, Information Processing & Telecommunications, 2nd Edition, John Wiley & Sons, 1987, pp. 102 and 338.
Rosenberg, Jerry M., Dictionary of Computers, Information Processing & Telecommunications, 2nd Edition, John Wiley & Sons, 1987, pp. 305.
Graf, Rudolf F., Modern Dictionary of Electronics, Howard W. Sams & Company, 1988, pp. 273.
Graf, Rudolf F., Modern Dictionary of Electronics, Howard W. Sams & Company, 1984, pp. 566.
Wikipeida, definition of "subroutine", published Nov. 29, 2003, four pages.
Graston et al. (Software Pipelining Irregular Loops On the TMS320C6000 VLIW DSP Architecture); Proceedings of the ACM SIGPLAN workshop on Languages, compilers and tools for embedded systems; pp. 138-144; Year of Publication: 2001.
SearchStorage.com Definitions, "Pipeline Burst Cache," Jul 31, 2001, url: http://searchstorage.techtarget.com/sDefinition/0,,sid5_gci214414,00.html.
Brown, Brian; "Data Structure and Number Systems"; 2000; http://www.ibilce.unesp.br/courseware/datas/data3.htm.
Heirich; Optimal Automatic Mulit-pass Shader Partitioning by Dynamic Programming; Eurographics—Graphics Hardware (2005); Jul. 2005.
Hutchins E., SC10: A Video Processor and Pixel-Shading GPU for Handheld Devices; presented at the Hot Chips conferences on Aug. 23, 2004.
Wilson D., NVIDIA's Tiny 90nm G71 and G73: GeForce 7900 and 7600 Debut; at http://www.anandtech.com/show/1967/2; dated Sep. 3, 2006, retrieved Jun. 16, 2011.
Woods J., NVIDIA GeForce FX Preview, at http://www.tweak3d.net/reviews/nvidia/nv30preview/1.shtml; dated Nov. 18, 2002; retrieved Jun. 16, 2011.
NVIDIA Corporation, Technical Brief: Transform and Lighting; dated 1999; month unknown.
Merriam-Webster Dictionary Online; Definition for "program"; retrieved Dec. 14, 2010.
Gadre, S., Patent Application Entitled "Video Processor Having Scalar and Vector Components With Command FIFO for Passing Function Calls From Scalar to Vector", U.S. Appl. No. 11/267,700, filed Nov. 4, 2005.
Gadre, S., Patent Application Entitled "Stream Processing in a Video Processor", U.S. Appl. No. 11/267,599, filed Nov. 4, 2005.
Karandikar et al., Patent Application Entitled: "Multidemnsional Datapath Processing in a Video Processor", U.S. Appl. No. 11/267,638, filed Nov. 4, 2005.
Karandikar et al., Patent Application Entitled: "A Latency Tolerant System for Executing Video Processing Operations", U.S. Appl. No. 11/267,875, filed Nov. 4, 2005.
Gadre, S., Patent Application Entitled "Separately Schedulable Condition Codes for a Video Processor", U.S. Appl. No. 11/267,793, filed Nov. 4, 2005.
Lew, et al., Patent Application Entitled "A Programmable DMA Engine for Implementing Memory Transfers for a Video Processor", U.S. Appl. No. 11/267,777, filed Nov. 4, 2005.
Karandikar et al., Patent Application Entitled: "A Pipelined L2 Cache for Memory Transfers for a Video Processor", U.S. Appl. No. 11/267,606, filed Nov. 4, 2005.
Karandikar, et al., Patent Application Entitled: "Command Acceleration in a Video Processor", U.S. Appl. No. 11/267,640, filed Nov. 4, 2005.
Karandikar, et al., Patent Application Entitled "A Configurable SIMD Engine in a Video Processor", U.S. Appl. No. 11/267,393, filed Nov. 4, 2005.
Karandikar, et al., Patent Application Entitled "Context Switching on a Video Processor Having a Scalar Execution Unit and a Vector Execution Unit", U.S. Appl. No. 11/267,778, filed Nov. 4, 2005.
Lew, et al., Patent Application Entitled "Multi Context Execution on a Video Processor", U.S. Appl. No. 11/267,780, filed Nov. 4, 2005.
Su, Z, et al., Patent Application Entitled: "State Machine Control for a Pipelined L2 Cache to Implement Memory Transfers for a Video Processor", U.S. Appl. No. 11/267,119, filed Nov. 4, 2005.
Kozyrakis, "A Media enhanced vector architecture for embedded memory systems," Jul. 1999, http://digitalassets.lib.berkeley.edu/techreports/ucb/text/CSD-99/1059.pdf.
HPL-PD A Parameterized Research Approach—May 31, 2004 http://web.archive.org/web/www.trimaran.org/docs/5_hpl-pd.pdf.
Intel, Intel Architecture Software Deveopler's Manual, vol. 1: Basic Architecture 1997 p. 8-1.
Intel, Intel Architecture Software Deveopler's Manual, vol. 1: Basic Architecture 1999 p. 8-1, 9-1.
Intel, Intel Pentium III Xeon Processor at 500 and 550Mhz, Feb 1999.

(56) References Cited

OTHER PUBLICATIONS

Free On-Line Dictionary of Computing (FOLDOC), defintion of "video", from foldoc.org/index.cgi? query=video&action=Search, May 23, 2008.
FOLDOC, definition of "frame buffer", from foldoc.org/index.cgi?query=frame+buffer&action=Search, Oct. 3, 1997.
PCreview, article entitled "What is a Motherboard", from www.pcreview.co.uk/articles/Hardware/What_is_a_Motherboard., Nov. 22, 2005.
FOLDOC, definition of "motherboard", from foldoc.org/index.cgi?query=motherboard&action=Search, Aug. 10, 2000.
FOLDOC, definition of "separate compilation", from foldoc.org/index.cgi?query=separate+compilation&action=Search, Feb. 19, 2005.
FOLDOC, definition of "vector processor", http://foldoc.org/, Sep. 11, 2003.
Wikipedia, defintion of "vector processor", http://en.wikipedia.org/, May 14, 2007.
Fisher, Joseph A., Very Long Instruction Word Architecture and the Eli-512, ACM, 1993, pp. 140-150.
FOLDOC (Free On-Line Dictionary of Computing), defintion of X86, Feb. 27, 2004.
FOLDOC, definition of "superscalar," http://foldoc.org/, Jun. 22, 2009.
FOLDOC, definition of Pentium, Sep. 30, 2003.
Wikipedia, definition of "scalar processor," Apr. 4, 2009.
Intel, Intel MMX Technology at a Glance, Jun. 1997.
Intel, Pentium Processor Family Developer's Manual, 1997, pp. 2-13.
Intel, Pentium processor with MMX Technology at 233Mhz Performance Brief, Jan. 1998, pp. 3 and 8.
Wikipedia, entry page defining term "SIMD", last modified Mar. 17, 2007.
FOLDOC, Free Online Dictionary of Computing, defintion of SIMD, foldoc.org/index.cgi?query=simd&action=Search, Nov. 4, 1994.
Definition of "queue" from Free on-Line Dictionary of Computing (FOLDOC), http://folddoc.org/index.cgi? query=queue&action=Search, May 15, 2007.
Definition of "first-in first-out" from FOLDOC, http://foldoc.org/index.cgi?query=fifo&action=Search, Dec. 6, 1999.
Definition of "block" from FOLDOC, http://foldoc.org/index.cgi?block, Sep. 23, 2004.
Quinnell, Richard A. "New DSP Architectures Go "Post-Harvard" for Higher Performance and Flexibility" Techonline; posted May 1, 2002.
Wikipedia, definition of Multiplication, accessed from en.wikipedia.org/w/index.php?title=Multiplication&oldid=1890974, published Oct. 13, 2003.
"Vertex Fog"; http://msdn.microsoft.com/library/en-us/directx9_c/Vertex_fog.asp?frame=true Mar. 27, 2006.
"Anti-aliasing"; http://en.wikipedia.org/wiki/Anti-aliasing; Mar. 27, 2006.
"Alpha Testing State"; http://msdn.microsoft.com/library/en-us/directx9_c/directx/graphics/programmingguide/GettingStarted/Direct3Kdevices/States/renderstates/alphatestingstate.asp Mar. 25, 2005.
Defintion of "Slot," http://www.thefreedictionary.com/slot, Oct. 2, 2012.
Korean Intellectual Property Office; English Abstract for Publication No. 100262453, corresponding to application 1019970034995, 2001.
Espasa R et al: "Decoupled vector architectures", High-Performance Computer Architecture, 1996. Proceedings., Second International Symposium on San Jose, CA, USA Feb. 3-7, 1996, Los Alamitos, CA, USA, IEEE Comput. Soc, US, Feb. 3, 1996, pp. 281-290, XPO1 0162067. DOI: 10.11 09/HPCA, 1996.501193 ISBN: 978-0-8186-7237-8.
Dictionary of Computers, Information Processing & Technology, 2nd edition. cited by applicant.
Karandikar et al., Patent Application Entitled A Pipelined L2 Cache for Memory Transfers for A Video Processor:, U.S. Appl. No. 11/267,606, filed Nov. 4, 2005.
Gadre, S., Patent Application Entitled "Video Processor Having Scalar and Vector Components With Command FIFO for Passing Function Calls From Scalar to Vector", U.S. Appl. No. 11/267,700, filed Nov. 4, 2005. cited by applicant.

* cited by examiner

PROGRAM SEQUENCER FOR GENERATING INDETERMINANT LENGTH SHADER PROGRAMS FOR A GRAPHICS PROCESSOR

CROSS REFERENCE TO RELATED APPLICATIONS

This application is related to the following U.S. patent applications: "FRAGMENT SPILL/RELOAD FOR A GRAPHICS PROCESSOR", by Mahan et al., filed on Aug. 15, 2007, 11/893502; "SHADER PROGRAM INSTRUCTION FETCH", by Mahan et al., filed on Aug. 15, 2007, 11/893503; and "SOFTWARE ASSISTED SHADER MERGING", by Mahan et al., filed on Aug. 15, 2007, 11/893439.

FIELD OF THE INVENTION

The present invention is generally related to programming graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data. Generally, the instructions/data are fed into the front end of the pipeline and the computed results emerge at the back end of the pipeline. The hardware-based functional units, cache memories, firmware, and the like, of the GPU are optimized to operate on the low-level graphics primitives and produce real-time rendered 3-D images.

In modern real-time 3-D graphics rendering, the functional units of the GPU need to be programmed in order to properly execute many of the more refined pixel shading techniques. These techniques require, for example, the blending of colors into a pixel in accordance with factors in a rendered scene which affect the nature of its appearance to an observer. Such factors include, for example, fogginess, reflections, light sources, and the like. In general, several graphics rendering programs (e.g., small specialized programs that are executed by the functional units of the GPU) influence a given pixel's color in a 3-D scene. Such graphics rendering programs are commonly referred to as shader programs, or simply shaders. In more modern systems, some types of shaders can be used to alter the actual geometry of a 3-D scene (e.g., Vertex shaders) and other primitive attributes.

In a typical GPU architecture, each of the GPU's functional units is associated with a low level, low latency internal memory (e.g., register set, etc.) for storing instructions that programmed the architecture for processing the primitives. The instructions typically comprise shader programs and the like. The instructions are loaded into their intended GPU functional units by propagating them through the pipeline. As the instructions are passed through the pipeline, when they reach their intended functional unit, that functional unit will recognize its intended instructions and store them within its internal registers.

Prior to being loaded into the GPU, the instructions are typically stored in system memory. Because the much larger size of the system memory, a large number of shader programs can be stored there. A number of different graphics processing programs (e.g., shader programs, fragment programs, etc.) can reside in system memory. The programs can each be tailored to perform a specific task or accomplish a specific result. In this manner, the graphics processing programs stored in system memory act as a library, with each of a number of shader programs configured to accomplish a different specific function. For example, depending upon the specifics of a given 3-D rendering scene, specific shader programs can be chosen from the library and loaded into the GPU to accomplish a specialized customized result.

The graphics processing programs, shader programs, and the like are transferred from system memory to the GPU through a DMA (direct memory access) operation. This allows GPU to selectively pull in the specific programs it needs. The GPU can assemble an overall graphics processing program, shader, etc. by selecting two or more of the graphics programs in system memory and DMA transferring them into the GPU.

A problem exists, however, in that the overall length of any given shader program is limited by the hardware resources of the GPU architecture. For example, as the GPU architecture is designed, its required resources are determined by the expected workload of the applications they architectures targeted towards. Based on the expected workload, design engineers include a certain number of registers, command table memory of a certain amount, cache memory of a certain amount, FIFOs of a certain depth, and the like. This approach leads to a built-in inflexibility. The so-called "high-end" architectures often include excessive amounts of hardware capability which goes unused in many applications. This leads to excessive cost, excessive power consumption, excessive heat, and the like. Alternatively, the so-called "midrange" or "low-end" architectures often have enough hardware capability to handle most applications, but cannot properly run the more demanding high-end applications. Unfortunately, these high-end applications often often have the most compelling and most interactive user experiences, and thus tend to be popular and in high demand.

Thus, a need exists for graphics architecture that implements a shader program loading and execution process that can scale as graphics application needs require and provide added performance without incurring penalties such as increased processor overhead.

SUMMARY OF THE INVENTION

Embodiments of the present invention provide a graphics architecture that implements a shader program loading and execution process that can scale as graphics application needs require and provide added performance without incurring penalties such as increased processor overhead.

In one embodiment, the present invention is implemented as a method for loading and executing an indeterminate length shader program (e.g., normal length shader programs, long shader programs, very long shader programs, etc.). To execute shader programs of indeterminate length, embodiments of the present invention execute such indeterminate length shader programs by executing them in portions. The method includes accessing a first portion of the shader program in graphics memory of the GPU and loading instructions from the first portion into a plurality of stages (e.g., ALU, etc.) of the GPU to configure the GPU for program execution. A group of pixels (e.g., a group of pixels covered by one or more primitives, etc.) is then processed in accordance with the instructions from the first portion. A second portion of the shader program is then accessed in graphics memory and instructions from the second portion are loaded into the plurality of stages to configure the GPU for program execution. The group of pixels are then processed in accordance with the instructions from the second portion. Accordingly, the shader program can comprise more than two portions. In such a case, for each of the portions, the GPU can process the group of pixels by loading instructions for the portion and executing instructions for that portion, and so on until all the portions comprising the shader program are executed.

In one embodiment, the GPU stores the group of pixels in graphics memory subsequent to program execution for the first portion. Subsequent to loading instructions from the second portion, the GPU accesses the group of pixels to perform program execution for the second portion. In one embodiment, the plurality of stages of the GPU are controlled by a program sequencer unit. The program sequencer unit functions by configuring the GPU to load instructions for the shader program and execute the shader program. In one embodiment, the program sequencer unit executes a state machine that coordinates the operation of the GPU.

In one embodiment, the state machine executing on the program sequencer unit controls the plurality of stages of the GPU to implement a recirculation of the group of pixels through the plurality of stages of the GPU for a complex graphics processing operation. The recirculation can be used to implement the complex graphics processing where more than one pass through the GPU pipeline is required. In one embodiment, the state machine controls the plurality of stages of the GPU to implement a basic graphics processing operation by implementing a single pass (e.g., one pass through the pipeline) of the group of pixels through the plurality of stages. The single pass-through mode can be used to implement comparatively basic graphics processing where, for example, a shader can be executed using a single pass through the stages of the GPU.

BRIEF DESCRIPTION OF THE DRAWINGS

The present invention is illustrated by way of example, and not by way of limitation, in the Figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.
Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

Figure 1:
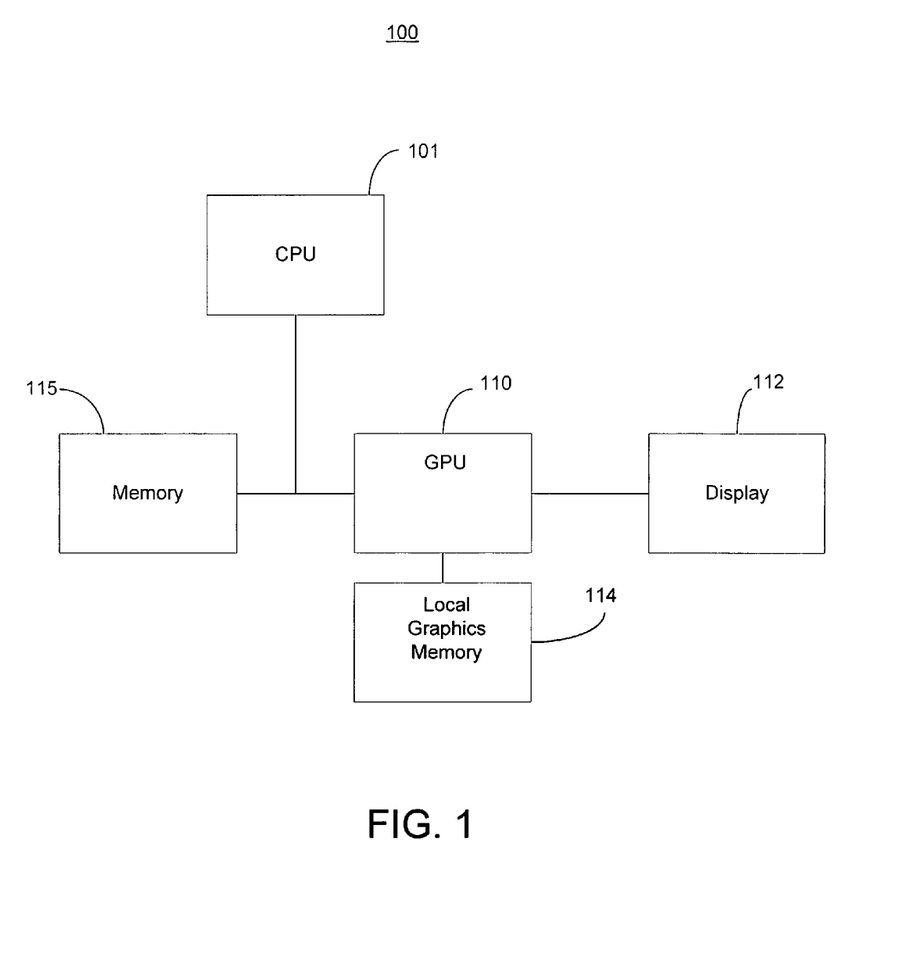
FIG. 1 shows a computer system in accordance with one embodiment of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.
Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown), or within the integrated circuit die of a PSOC (programmable system-on-a-chip). Additionally, a local graphics memory 114 can be included for the GPU 110 for high bandwidth graphics data storage.

EMBODIMENTS OF THE INVENTION

Figure 2:
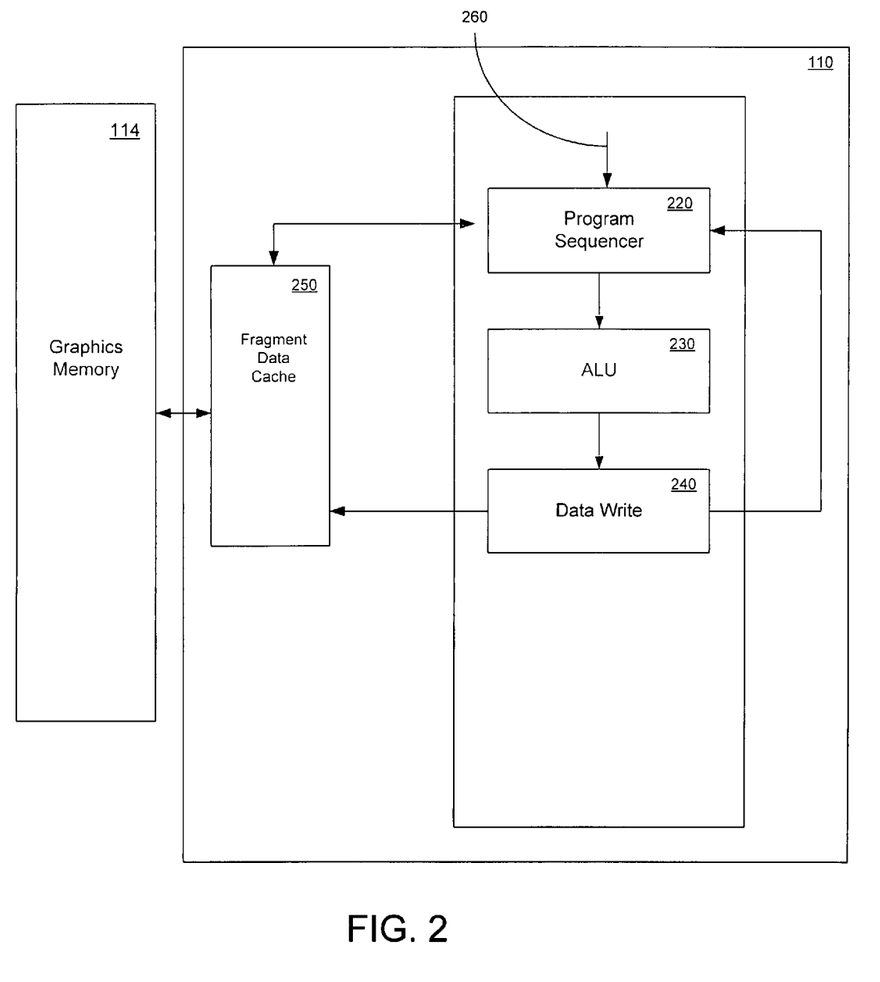
FIG. 2 shows a diagram 200 illustrating internal components of a GPU and a graphics memory in accordance with one embodiment of the present invention.

FIG. 2 shows a diagram 200 illustrating internal components of the GPU 110 and the graphics memory 114 in accordance with one embodiment of the present invention. As depicted in FIG. 2, the GPU 110 includes a graphics pipeline 210 and a fragment data cache 250 which couples to the graphics memory 114 as shown.

The FIG. 2 embodiment illustrates exemplary components of the GPU 110 that implement the method and system for loading and executing indeterminate length shader programs. The GPU 110 includes the graphics pipeline 210 which includes a number of functional modules. Three such functional modules of the graphics pipeline 210, for example the program sequencer 220, the ALU 230, and the data write component 240, function by rendering graphics primitives that are received from a graphics application (e.g., from a graphics driver, etc.). The functional modules 220-240 access information for rendering the pixels related to the graphics primitives via the fragment data cache 250. The fragment data cache 250 functions as a high-speed cache for the information stored in the graphics memory 114 (e.g., the frame buffer memory).

The program sequencer 220 functions by controlling the operation of the functional modules of the graphics pipeline 210. The program sequencer 220 can interact with the graphics driver (e.g., a graphics driver executing on the CPU 101) to control the manner in which the functional modules of the graphics pipeline 210 receive information, configure themselves for operation, and process graphics primitives. For example, in the FIG. 2 embodiment, graphics rendering data (e.g., primitives, triangle strips, etc.), pipeline configuration information (e.g., mode settings, rendering profiles, etc.), and rendering programs (e.g., pixel shader programs, vertex shader programs, etc.) are received by the graphics pipeline 210 over a common input 260 from an upstream functional module (e.g., from an upstream raster module, from a setup module, or from the graphics driver). The input 260 functions as the main fragment data pathway, or pipeline, between the functional modules of the graphics pipeline 210. Primitives are generally received at the "top" of the pipeline and are progressively rendered into resulting rendered pixel data as they proceed from one module to the next along the pipeline.

In one embodiment, data proceeds between the functional modules 220-240 in a packet based format. For example, the graphics driver transmits data to the GPU 110 in the form of data packets. Data packets that send configuration and programming information are referred to as register packets. Data packets are specifically configured to interface with and be transmitted along the fragment pipe communications pathways of the pipeline 210. Data packets that send pixel data and/or rendering attributes are referred to as pixel packets. Data packets that send pixel data and/or rendering attributes that are common for a group of pixels are referred to as span header packets. The data packets generally includes information regarding a group or tile of pixels (e.g., 4 pixels, 8 pixels, 16 pixels, etc.) and coverage information for one or more primitives that relate to the pixels. The data packets can also include configuration information that enables the functional modules of the pipeline 210 to configure themselves for rendering operations. For example, the data packets can include configuration bits, instructions, functional module addresses, etc. that that can be used by one or more of the functional modules of the pipeline 210 to configure itself for the current rendering mode, or the like. In addition to pixel rendering information and functional module configuration information, the data packets can include shader program instructions that program the functional modules of the pipeline 210 to execute shader processing on the pixels. For example, the instructions comprising a shader program can be transmitted down the graphics pipeline 210 and be loaded by one or more designated functional modules. Once loaded, during rendering operations, the functional module can execute the shader program on the pixel data to achieve the desired rendering effect.

In this manner, the highly optimized and efficient fragment pipe communications pathway implemented by the functional modules of the graphics pipeline 210 can be used not only to transmit pixel data between the functional modules (e.g., modules 220-240), but to also transmit configuration information and shader program instructions between the functional modules.

Referring still to FIG. 2, in the present embodiment, the program sequencer 220 functions by controlling the operation of the other components of the graphics pipeline 210 and working in conjunction with the graphics driver to implement a method for loading and executing an indeterminate length shader program. As used herein, the term "indefinite length" or "indeterminate length" shader program refers to the fact that the shader programs that can be executed by the GPU 110 are not arbitrarily limited by a predetermined, or format based, length. Thus for example, shader programs that can be executed can be short length shader programs (e.g., 16 to 32 instructions long, etc.), normal shader programs (e.g., 64 to 128 instructions long, etc.), long shader programs (e.g., 256 instructions long, etc.), very long shader programs (e.g., more than 1024 instructions long, etc) or the like.

To execute shader programs of indeterminate length, the program sequencer 220 controls the graphics pipeline 210 to execute such indeterminate length shader programs by executing them in portions. The program sequencer 220 accesses a first portion of the shader program from the system memory 114 and loads the instructions from the first portion into the plurality of stages of the pipeline 210 (e.g., ALU 230, data write component 240, etc.) of the GPU 110 to configure the GPU 110 for program execution. As described above, the instructions for the first portion can be transmitted to the functional modules of the graphics pipeline 210 as pixel packets that propagate down the fragment pipeline. A group of pixels (e.g., a group of pixels covered by a one or more primitives, etc.) is then processed in accordance with the instructions from the first portion. A second portion of the shader program is then accessed (e.g., DMA transferred in from the system memory 115) and instructions from the second portion are then loaded into the plurality of stages of the pipeline 210.

The group of pixels are then processed in accordance with the instructions from the second portion. In this manner, multiple shader program portions can be accessed, loaded, and executed to perform operations on the group of pixels. For example, for a given shader program that comprises a hundred or more portions, for each of the portions, the GPU can process the group of pixels by loading instructions for the portion and executing instructions for that portion, and so on until all the portions comprising the shader program are executed. This attribute enables embodiments of the present invention to implement the indefinite length shader programs. As described above, no arbitrary limit is placed on the length of a shader program that can be executed.

Figure 3:
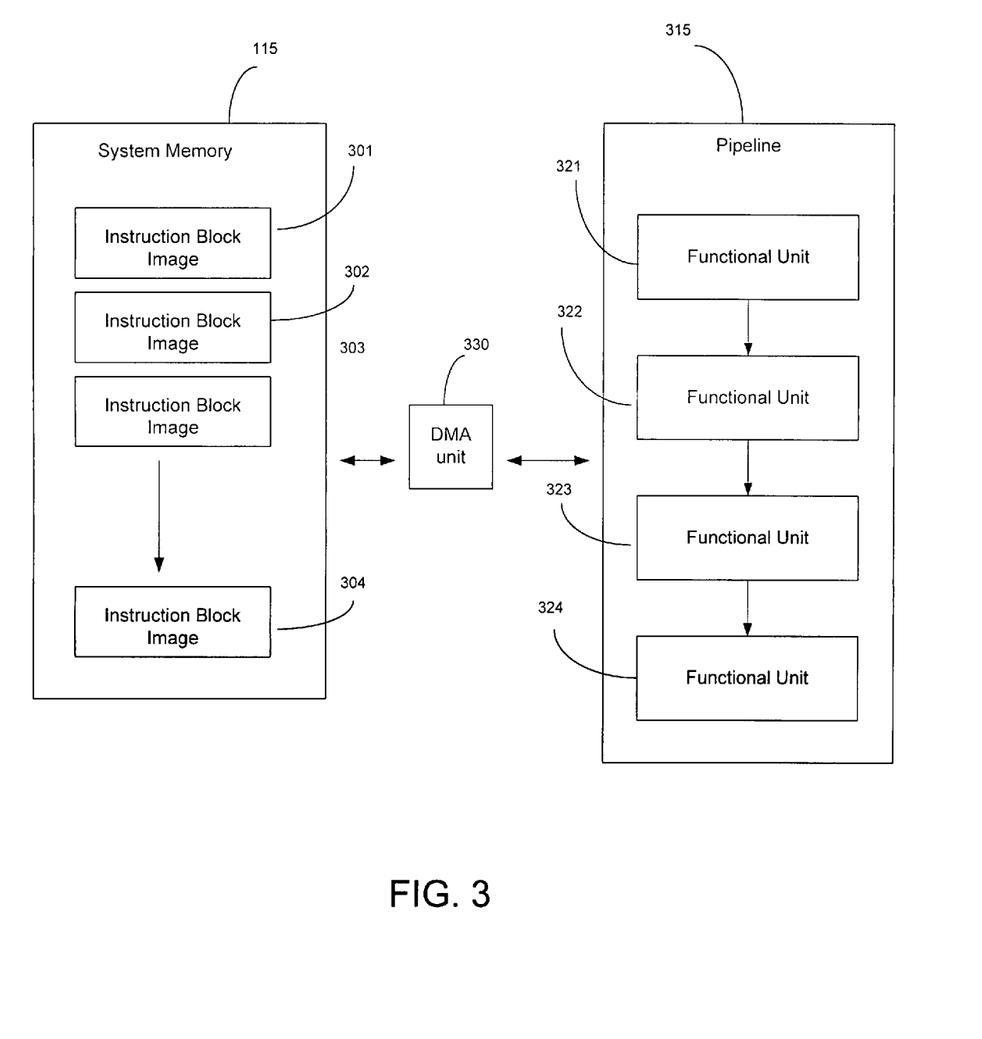
FIG. 3 shows a diagram of a system memory and a plurality of functional modules of a graphics pipeline in accordance with one embodiment of the present invention.

FIG. 3 shows a diagram of the system memory 115 and a plurality of functional modules 321-324 of a graphics pipeline 315 in accordance with one embodiment of the present invention. As depicted in FIG. 3, the system memory 115 includes a plurality of instruction block images 301-304. These instruction block images are basically small shader programs that can be assembled, using two or more such small shader programs, into a large shader program. In this manner, the instruction block images 301-304 can be viewed as portions of a large shader program, as described above. A portion of a shader program is at times referred to as an epoch.

The functional modules 321-324 are typical functional modules of the 3-D graphics rendering pipeline 315 (e.g., setup unit, raster unit, texturing unit, etc.). The 3-D graphics rendering pipeline 315 comprises a core component of a GPU, and can be seen as more basic diagram of the pipeline 210 from FIG. 2. The FIG. 3 embodiment shows the plurality of instruction block images 301-304 that can be DMA transferred into the pipeline 315 for use by one or more of the functional modules 321-324. The instruction block images 301-304 are configured to implement particular graphics rendering functions. In one embodiment, they are stored within the system memory 115 and are DMA transferred, via the DMA unit 331, when they are needed to perform graphics rendering operations on a group of pixels (e.g., being rendered on the GPU 110).

Each of the instruction block images 301-304 comprise a graphics rendering epoch that programs the hardware components of, for example, a functional unit 322 (e.g., an ALU unit, etc.) to perform a graphics rendering operation. A typical instruction block image (e.g., instruction block image 301) comprises a number of instructions. In the DMA transfer embodiment described above, the instruction block images are stored in system memory 115 and are maintained there until needed by a graphics application executing on the GPU 110.

The FIG. 3 embodiment indicates that a large number of instruction block images can be stored within the system memory 115 (e.g., 50 instruction block images, 200 instruction block images, or more). The large number of different instruction block images allows flexibility in fashioning specific graphics rendering routines that are particularly suited to the needs of a graphics application. For example, indeterminate length complex rendering routines can be fashioned by arranging multiple smaller rendering programs to execute in a coordinated fashion (e.g., arranging two or more shader programs to execute sequentially one after the other).

In one embodiment, the GPU 110 stores the group of pixels in graphics memory 114 subsequent to program execution for the first portion. This clears the fragment data pipe and the pipeline stages to be used for loading instructions for the second portion. Subsequent to loading instructions from the second portion, the GPU 110 accesses the group of pixels in the graphics memory 114 to perform program execution for the second portion. In this manner, the program sequencer 220 loads the first portion of the shader program, processes the group of pixels in accordance with the first portion, temporarily stores the intermediate result in the graphics memory 114, loads the second portion of the shader program, retrieves the intermediate results from the graphics memory 114 and processes the group of pixels (e.g., the intermediate results) in accordance with the second portion. This process can be repeated until all portions of a indeterminate length shader program have been executed and the group of pixels have been complete a processed. The resulting processed pixel data is then transferred to the graphics memory 114 for rendering onto the display (e.g., display 112).

Figure 4:
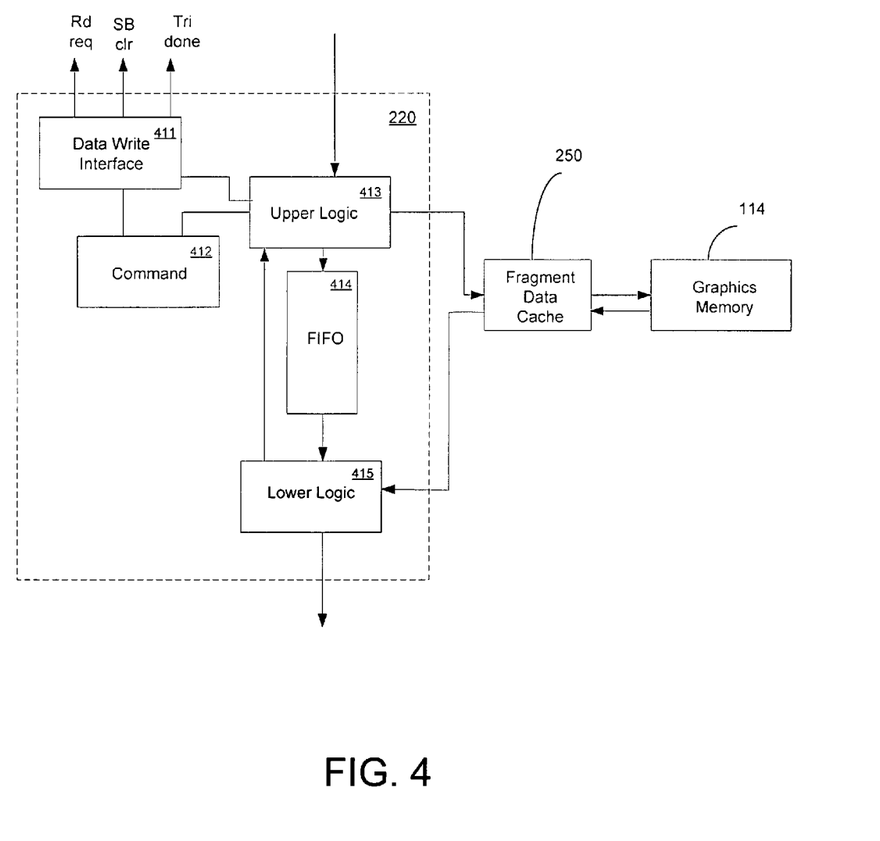
FIG. 4 shows a diagram of the internal components of the program sequencer in accordance with one embodiment of the present invention.

FIG. 4 shows a diagram of the internal components of the program sequencer 220 in accordance with one embodiment of the present invention. As depicted in FIG. 4, the program sequencer 220 includes an interface with the data write module 411 and a command unit 412 coupled to an upper logic unit 413. The upper logic unit 413 is coupled to the FIFO 414 and a lower logic unit 415 as shown.

As described above, the program sequencer 220 functions by managing the data flow through the pipeline 210 and managing the program execution of the functional modules of the pipeline 210. For example, the program sequencer 220 sets up the pipeline 210 for multiple pass or single pass operation, where a given group of pixels are passed through one or more functional modules of the pipeline 210 multiple times to implement more complex shader processing, or the group of pixels is passed through the functional modules of the pipeline 210 a single time to implement comparatively straightforward, less complex shader processing. The operation of the program sequencer 220 is controlled by a command unit 412 which executes a state machine that coordinates the operation of the program sequencer 220, and thus controls the operation of the GPU 110.

The upper logic unit 413 functions by receiving incoming pixel packets (e.g., from an upstream set up module or from a graphics driver). The upper logic unit examines the data/instructions of the received pixel packets and initiates any requests to memory that may be needed to process the data/instructions of the pixel packets. These memory requests are provided to the fragment that cache 250 which then fetches the requested data from the graphics memory 114 as shown in FIG. 4. The returned data comes from the graphics memory 114, through the fragment data cache 250, to the lower logic unit 415.

The lower logic unit 415 functions by merging the returning data from the graphics memory 114 into the data/instructions of the data packets that were received by the upper logic unit 413. The received pixel packets are passed from the upper logic unit 413 into a FIFO 414. The pixel packets then sequentially passed through the many stages of the FIFO 414 and emerge at the bottom of the FIFO 414 and are received by the lower logic unit 415. In this manner, the FIFO 414 functions by hiding the latency incurred between requests to the fragment data cache 250 and the graphics memory 114 and the return of the requested data from the graphics memory 114 to the lower logic unit 415. The lower logic unit 415 then merges the returned data with the originating data packet. In one embodiment, the FIFO 414 has sufficient number of stages and is designed in such manner as to allow the insertion of one pixel packet each clock at the top and the output of one pixel packet each clock at the bottom.

The FIG. 4 embodiment also shows a feedback path that proceeds from the lower logic unit 415 back up to the upper logic unit 413. This feedback from the lower logic unit 415 to the upper logic unit 413 accommodates those situations where the lower logic unit 415 generates register writes and sends those register writes back up to the upper logic unit 413. Register writes refer to that case where the instructions, configuration bits, or the like returned from the graphics memory 114 need to be written into one or more control registers of the command unit 412 to program the program sequencer 220. The register writes are then provided by the upper logic unit 413 to the command unit 412.

The FIG. 4 embodiment shows a set of outputs generated by the data write interface. In this implementation, the data write interface unit 411 functions by generating outputs that control the functioning of the other functional modules of the graphics pipeline 210. As shown in FIG. 4, the outputs comprise a read request (e.g., Rd req), a scoreboard clear request (e.g., SB clr), and a triangle done signal (e.g., Tri done). The data write interface unit 411 generates the outputs in accordance with instructions received from the command unit 412 (e.g., which executes the program sequencer state machine).

The read request output (e.g., Rd req) provides a path for outputs of a particular register to flow out of the program sequencer unit 220 and to circulate to other functional modules of the graphics pipeline 210 (e.g., can circulate out to the data write module 240, etc.) until the data returns to the program sequencer 220. The scoreboard clear output (e.g., SB clr) is used to coordinate access to the graphics memory 114 to manage read-modify-write data hazards that may occur when, for example, pixel data is updated by rendering processes performed by the graphics pipeline 210 but the memory location containing the pixel data is read by a functional module before the update has been fully realized (e.g., before the memory location is changed to reflect the updated pixel data). The triangle done output (e.g., Tri done) functions in a manner similar to the scoreboard clear output. The triangle done output is used to let other functional modules of the graphics pipeline 210 know when a graphics primitive (e.g., triangle) has completed processing through the pipeline 210. This lets the functional modules avoid read-modify-write hazards that can occur when a large number of triangles are in-flight at a time (e.g., 32 triangles in flight, or more).

Figure 5:
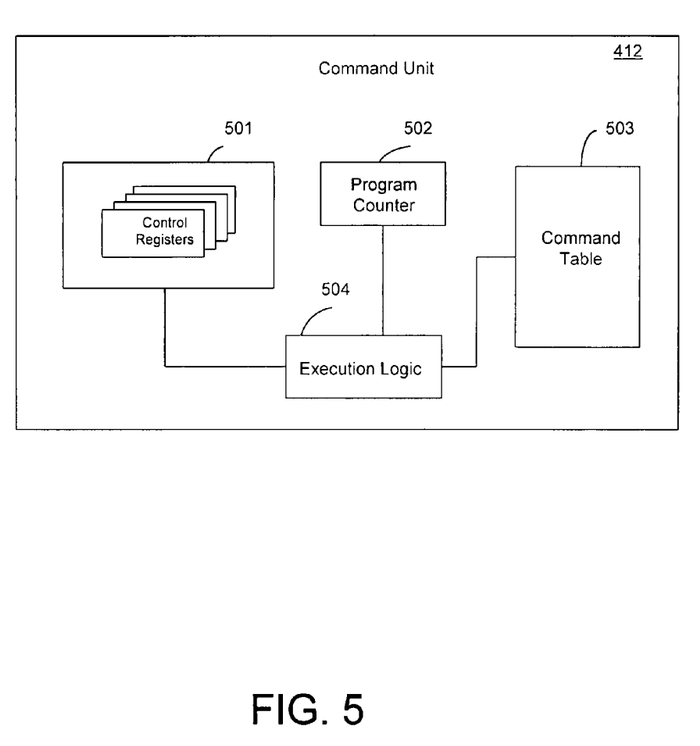
FIG. 5 shows a diagram of the internal components of a command unit in accordance with one embodiment of the present invention.

FIG. 5 shows a diagram of the internal components of the command unit 412 in accordance with one embodiment of the present invention. As illustrated in FIG. 5, the command unit 412 includes a plurality of control registers 501, a program counter 502, and the command table 503, coupled to execution logic 504. The control registers are for accepting and providing configuration information and state information from/to the other functional modules of the graphics pipeline 210. The command table 503 stores the commands that comprise the program instructions of the state machine that executes within the command unit 412. The program counter 502 keeps track of the current state and the next state for the state machine and indexes the instructions of the command table. The execution logic 504 includes the hardware sequential logic that implements the transitions of the state machine, which is shown in FIG. 6 below.

Figure 6:
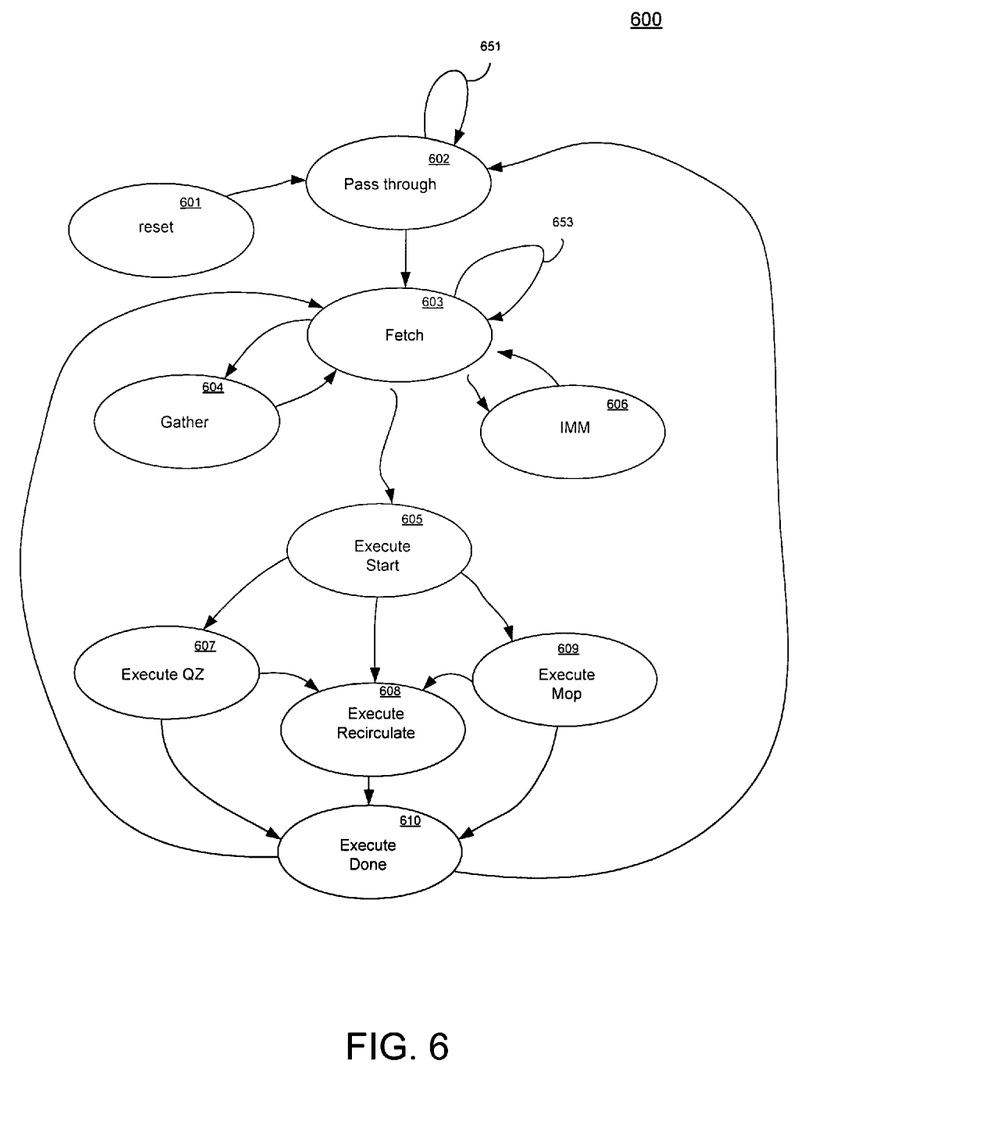
FIG. 6 shows a diagram of a state machine executing on the program sequencer in accordance with one embodiment of the present invention.

FIG. 6 shows a diagram of a state machine 600 executing on the program sequencer 220 in accordance with one embodiment of the present invention.

The initial state of the state machine 600 is the reset state 601. The reset state 601 is configured to establish a known initial state of the various registers, logic components, and the like of the command unit 412. The reset state 601 is the initial state the command unit 412 comes up in upon an initial power up. The reception of a span start by the program sequencer 220 causes an exit from the reset state 601 to the pass through state 602. A span start comprises a header for an arriving group of pixel packets for a group of pixels that are received by the program sequencer 220. The span start also comprises the initial variables in common information that enables work on the group of pixels to begin.

After reset 601, the state machine 600 transitions to the pass through state 602, where one of two modes of execution is established for the graphics pipeline 210. These modes are either recirculation mode or pass-through mode. Recirculation mode is used when multiple passes through the graphics pipeline 210 are needed in order to implement comparatively complex shader processing. Pass-through mode is used when a single pass through the graphics pipeline 210 can be used to implement comparatively simple shader processing. If the control registers 501 indicate the pass-through mode, the transition 651 allows the state machine 600 to remain in pass-through mode until all the pixels of the pixel packets have been processed. If the pixel packets indicate command table execution or recirculation mode, the state machine moves into the fetch state 603.

The fetch state 603 is where the program sequencer 220 fetches program instructions for execution from the command table 503. These instructions are indexed by the program counter 502. As described above, in one embodiment, the command unit 412 commands the upper logic module 413 to initiate an instruction fetch from the graphics memory 114, which returns the instructions to the lower logic unit 415 and then passes the instructions back to the upper logic unit 413 and into the command unit 412, and into the other functional modules of the graphics pipeline 210. The transition 653 allows the fetch state 603 to repeat until all of the instructions needed for that shader program or shader program portion have been fetched. When the instruction fetch state 603 is complete, the state machine 610 transitions to a gather state 604, an execute start state 605, or an IMM (e.g., insert immediate) state 606.

The gather state 604 is where the program sequencer 220 gathers rendering commands from the graphics memory 114 and/or the system memory 115. These commands are used to load the command table 503 of the command unit 412. The commands also establish the location of the program counter 502. Additionally, the gather state 604 can also load control registers 510 and module instructions (e.g., not shown) in the functional units 321-324, etc. As described above, the state machine 600 is controlled by the command unit 412 executing the command table 503 as indexed by the program counter 502. Once the commands have been gathered, the state machine 600 transitions back to the fetch state 603 as shown.

The insert immediate state 606 is where a register packet is inserted into the pipeline, for updating functional instructions, control registers (like 501), etc. The data for this register packet is in the command instruction (e.g., from the command table 503).

The execute start state 605 is where command table execution in accordance with the program counter 502 begins. As described above, execution of the command table 503 causes the execution of the shader program. The execute start state 605 will transition into either the execute QZ state 607, the execute recirculate state 608, or the execute mop state 609.

The execute QZ state 607 is where the graphics pipeline 210 executes pixels received from the earlier stages of the GPU 110 (e.g., a raster stage, set up stage, or the like) or from the graphics driver, via the pipeline input 260. The pixels flow into the pipeline 210 and are progressively processed by each of the functional modules of the pipeline 210. State machine 600 can proceed from the execute QZ state 607 to the execute recirculate state 608 or the execute done state 610.

The execute recirculate state 608 is where the graphics pipeline 210 executes recirculating pixel data that has already passed through the graphics pipeline 210 at least one time. The state machine 600 can proceed from the execute recirculate state to the execute done state 610.

The execute mop state 609 is where the graphics pipeline 210 fetches pixel data from the graphics memory 114 for shader program execution. The state machine 600 can proceed from the execute mop state 609 to the execute recirculate state 608 or the execute done state 610.

The execute done state 610 is when shader program execution is complete for the particular shader portion, or epoch, is done. The state machine 600 can transition from the execute done state 610 back to the fetch state 603 or back to the pass-through state 602 as shown.

In this manner, the state machine 600 can control the program sequencer unit 220, and in turn control graphics pipeline 210 and the GPU 110, to implement the loading and execution of indeterminate length shader programs. For very long shader programs having a large number of epochs, the process is repeated until all of the epochs have been completed. One or more of the epochs of the very long shader program could involve recirculation one or more times through the graphics pipeline 210 (e.g., via the execute recirculate state 608).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for loading and executing an indeterminate length shader program, comprising:
accessing a first portion of a shader program in graphics memory of a GPU;
loading instructions from the first portion into a plurality of stages of the GPU to configure the GPU for program execution;
processing a group of pixels in accordance with the instructions from the first portion;
accessing a second portion of the shader program in graphics memory of the GPU;
loading instructions from the second portion into the plurality of stages of the GPU to configure the GPU for program execution; and
processing the group of pixels in accordance with the instructions from the second portion, wherein the group of pixels are processed in accordance with the per first portion and subsequently processed in accordance with the 2nd portion to avoid shader program length limits and fragment surface count limits.

2. The method of claim 1, further comprising:
storing the group of pixels in graphics memory subsequent to program execution for the first portion; and
subsequent to loading instructions from the second portion, accessing the group of pixels to perform program execution for the second portion.

3. The method of claim 1, wherein the plurality of stages of the GPU are controlled by a program sequencer unit, and wherein the program sequencer unit configures the GPU to load instructions for the shader program and execute the shader program.

4. The method of claim 3, wherein the program sequencer unit executes a state machine that coordinates the operation of the GPU.

5. The method of claim 4, wherein the shader program comprises more than two portions, and for each of the portions the program sequencer unit causes the GPU to process the group of pixels in accordance with the portion.

6. The method of claim 4, wherein the state machine controls the plurality of stages of the GPU to implement a recirculation of the group of pixels through the plurality of stages of the GPU for a complex graphics processing operation.

7. The method of claim 4, wherein the state machine controls the plurality of stages of the GPU to implement a pass-through of the group of pixels through the plurality of stages of the GPU for a basic graphics processing operation.

8. A GPU (graphics processing unit) for loading and executing a shader program, comprising:
an integrated circuit die comprising a plurality of stages of the GPU;
a memory interface for interfacing with a graphics memory;
a host interface for interfacing with a computer system; and
a program sequencer unit for controlling each of the plurality of stages, wherein the program sequencer causes the GPU to:
access a first portion of a shader program in graphics memory of a GPU;
load instructions from the first portion into a plurality of stages of the GPU to configure the GPU for program execution;
process a group of pixels in accordance with the instructions from the first portion;
access a second portion of the shader program in graphics memory of the GPU;
load instructions from the second portion into the plurality of stages of the GPU to configure the GPU for program execution; and
process the group of pixels in accordance with the instructions from the second portion, wherein the group of pixels are processed in accordance with the per first portion and subsequently processed in accordance with the 2nd portion to avoid shader program length limits and fragment surface count limits.

9. The GPU of claim 8, further comprising:
storing the group of pixels in graphics memory subsequent to program execution for the first portion; and
subsequent to loading instructions from the second portion, accessing the group of pixels to perform program execution for the second portion.

10. The GPU of claim 8, wherein the plurality of stages of the GPU are controlled by a program sequencer unit, and wherein the program sequencer unit configures the GPU to load instructions for the shader program and execute the shader program.

11. The GPU of claim 10, wherein the program sequencer unit executes a state machine that coordinates the operation of the GPU.

12. The GPU of claim 11, wherein the shader program comprises more than two portions, and for each of the portions the program sequencer unit causes the GPU to process the group of pixels in accordance with the portion.

13. The GPU of claim 11, wherein the state machine controls the plurality of stages of the GPU to implement a recirculation of the group of pixels through the plurality of stages of the GPU for a complex graphics processing operation.

14. The GPU of claim 11, wherein the state machine controls the plurality of stages of the GPU to implement a pass-through of the group of pixels through the plurality of stages of the GPU for a basic graphics processing operation.

15. A handheld computer system device, comprising:
a system memory;
a CPU coupled to the system memory; and
a GPU communicatively coupled to the CPU, wherein the GPU includes a program sequencer for controlling a plurality of stages of the GPU to execute a shader program, and wherein the program sequencer causes the GPU to:
access a first portion of the shader program in graphics memory of the GPU;
load instructions from the first portion into the plurality of stages of the GPU to configure the GPU for program execution;
process a group of pixels in accordance with the instructions from the first portion;
access a second portion of the shader program in graphics memory of the GPU;
load instructions from the second portion into the plurality of stages of the GPU to configure the GPU for program execution;
process the group of pixels in accordance with the instructions from the second portion;
store the group of pixels in graphics memory subsequent to program execution for the first portion; and
access the group of pixels to perform program execution for the second portion subsequent to loading instructions from the second portion, wherein the group of pixels are processed in accordance with the per first portion and subsequently processed in accordance with the 2nd portion to avoid shader program length limits and fragment surface count limits.

16. The handheld computer system device of claim 15, wherein the program sequencer unit configures the GPU to load instructions for the shader program and execute the shader program.

17. The handheld computer system device of claim 15, wherein the program sequencer unit executes a state machine that coordinates the operation of the GPU.

18. The handheld computer system device of claim 15, wherein the shader program comprises more than two portions, and for each of the portions the program sequencer unit causes the GPU to process to spend pixels in accordance with the portion.

19. The handheld computer system device of claim 15, wherein the state machine controls the plurality of stages of the GPU to implement a recirculation of the group of pixels through the plurality of stages of the GPU for a complex graphics processing operation.

20. The handheld computer system device of claim 15, wherein the state machine controls the plurality of stages of the GPU to implement a pass-through of the group of pixels through the plurality of stages of the GPU for a basic graphics processing operation.

* * * * *